United States Patent [19]
Sibley et al.

[11] Patent Number: 5,535,669
[45] Date of Patent: Jul. 16, 1996

[54] SPECIALLY SHAPED AUGER COMPACTOR HOUSING SECTION FOR EFFECTING EVEN DISTRIBUTION OF MATERIAL INTO BALE-FORMING CHAMBER HAVING RECTANGULAR CROSS SECTION

[75] Inventors: Dwight A. Sibley, Nashua, Mont.; Dale R. Dolberg, Hedrick, Iowa

[73] Assignee: Deere & Company, Moline, Ill.

[21] Appl. No.: 510,983

[22] Filed: Aug. 3, 1995

[51] Int. Cl.⁶ .............................. A01F 15/02; B30B 3/00
[52] U.S. Cl. ............................. 100/145; 56/341; 100/904
[58] Field of Search .................................. 100/145–150, 100/188 R, 191, 904, 908; 56/341

[56] References Cited

U.S. PATENT DOCUMENTS

| | | | |
|---|---|---|---|
| 2,080,316 | 5/1937 | Innes | 100/145 |
| 3,044,391 | 7/1962 | Pellett | 100/148 |
| 3,063,361 | 11/1962 | Gehrke | 100/145 |
| 3,218,993 | 11/1965 | Forth | 100/904 |
| 4,256,035 | 3/1981 | Neufeldt | 100/145 |
| 5,009,062 | 4/1991 | Urich et al. | 56/341 |
| 5,377,481 | 1/1995 | Sibley et al. | 56/341 |

FOREIGN PATENT DOCUMENTS

| | | | |
|---|---|---|---|
| 0009850 | 4/1980 | European Pat. Off. | 100/148 |
| 0291124 | 11/1988 | European Pat. Off. | 100/145 |

Primary Examiner—Stephen F. Gerrity

[57] ABSTRACT

A baler for forming parallelepiped bales includes an auger compactor located within a mainly cylindrical auger housing having a rear transition section including four corner feed structures spaced equally about the auger housing longitudinal axis. Each corner feed structure is defined by a pair of walls joined to define a corner which leads to a respective corner of a rectangular cross section bale-forming chamber at the rear end of the auger housing. The junction of one of the walls of each corner structure with the cylindrical auger housing is generally oriented so as to be crosswise to the direction of the auger flighting as it passes beneath the junction. A stripper plate is located along each junction, which occurs at the downstream side of the associated corner feed structure, as considered in the direction of rotation of the auger, for stripping material from the outer part of the auger flighting so that it enters the corner feed structure. The stripper plates also serve to support the rear end of the auger.

11 Claims, 3 Drawing Sheets

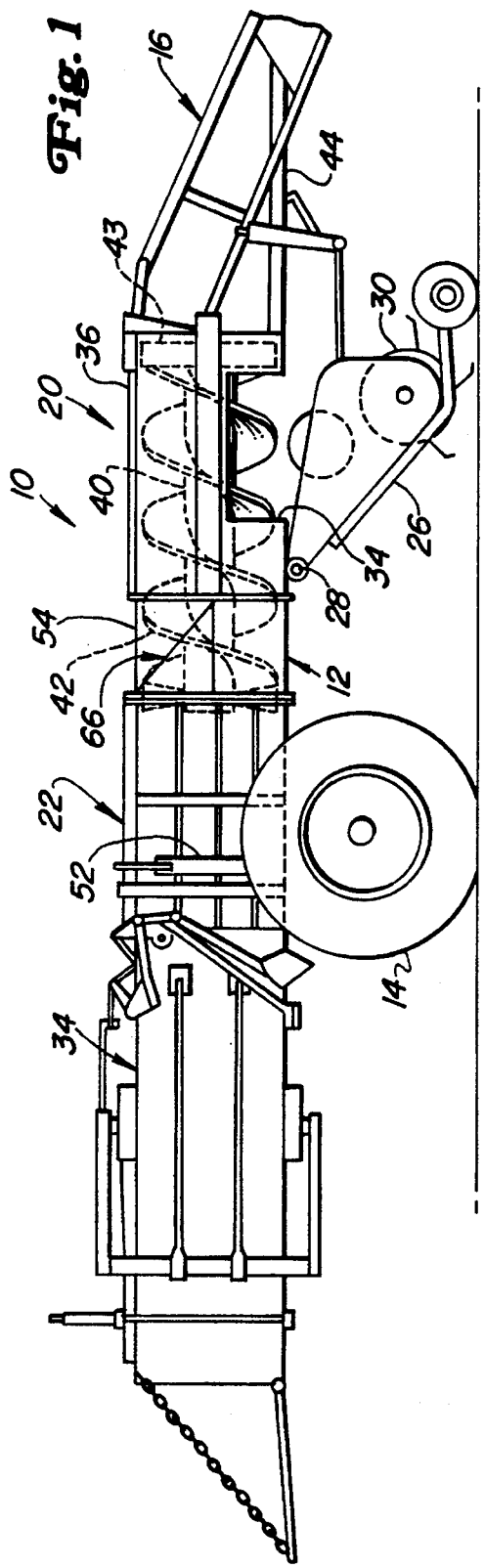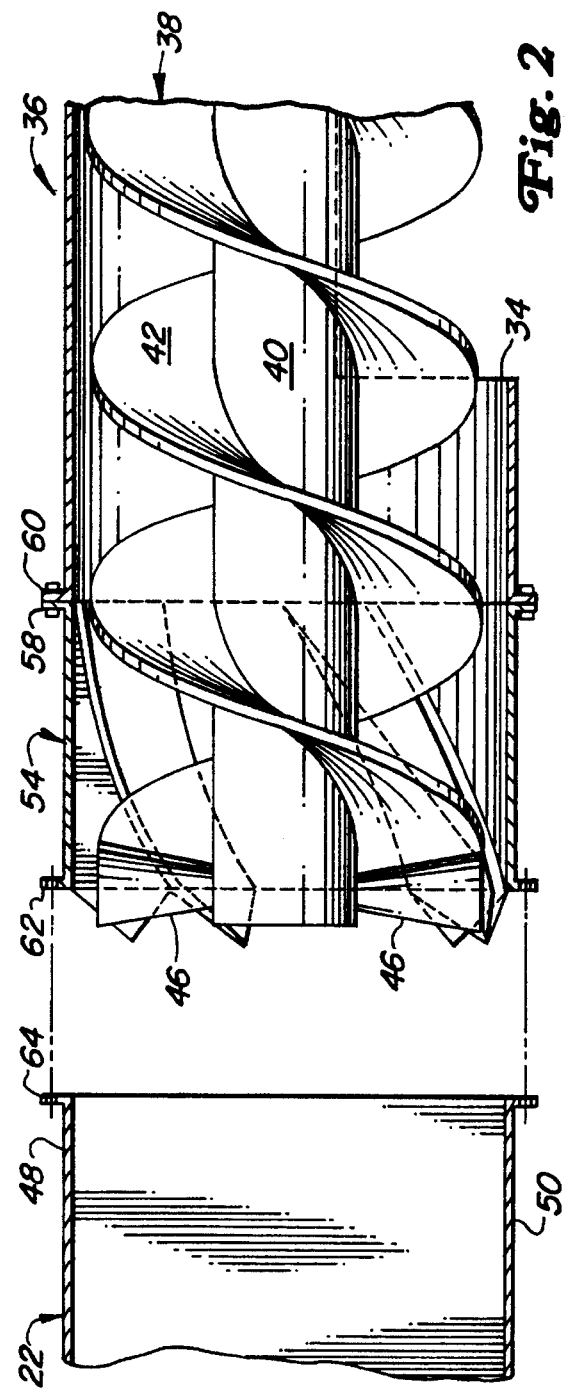

SPECIALLY SHAPED AUGER COMPACTOR HOUSING SECTION FOR EFFECTING EVEN DISTRIBUTION OF MATERIAL INTO BALE-FORMING CHAMBER HAVING RECTANGULAR CROSS SECTION

BACKGROUND OF THE INVENTION

The present invention relates to a baler for forming parallelepiped bales and more specifically relates to such a baler which utilizes an auger for compacting material to form such bales.

A baler of the aforementioned type is known and is disclosed in U.S. Pat. No. 5,377,481 issued on 3 Jan. 1995 to Sibley et al. This prior art baler has the drawback that the bales produced have somewhat rounded corners due to crop material exiting the cylindrical auger housing in which the compaction auger is located not filling the corners of the rectangular cross section baling chamber following the auger housing. The shape of the bales is not satisfactory from an appearance or stackability stand point.

Another baler which uses an auger to compact fibrous material into a bale of rectangular cross section is disclosed in U.S. Pat. No. 5,009,062 issued on 23 April 1991 to Urich et al. This patent discloses a tubular die wholly or at least partly of rectangular cross section located at the downstream end of the auger housing for extruding the fibrous material into a bale-forming chamber having a rectangular cross section more-or-less dimensioned commensurate with the aft end of the die. This baler, when making bales of alfalfa hay, has the drawback of not producing bales with firm, square corners since it is mostly the leaves of the hay that end up in the corners which results in the corners not being bound together sufficiently to maintain their shape and density. This baler has the further drawback of requiring extra length to accommodate the die between the auger housing and baling-chamber.

SUMMARY OF THE INVENTION

According to the present invention, there is provided an improved baler of the type using an auger to compact the material being baled.

An object of the invention is to provide a baler of the type using an auger compactor which produces parallelepiped bales having material distributed evenly throughout the bale, including its corners.

A more specific object of the invention is to provide a baler, as set forth in the previous object, which has a specially shaped auger housing section that operates to cause material being baled to be distributed to the corners of the baling chamber for forming parallelepiped bales having compact square corners, with no increase in length of the baler resulting from the presence of said housing section.

Yet a more specific object of the invention is to provide an auger housing with a transition section having four identical, angular corner feed structures spaced equally about the longitudinal axis of the auger housing, with each structure having two walls diverging towards a downstream end of said transition section, adjacent a forward end of a respective corner of the bale-forming chamber, from a common apex located at an upstream end of said transition section, with one side of the corner feed structure being in the form of a right triangle disposed co-planar with a respective wall of the bale-forming chamber and being joined at its hypotenuse with the other wall of the corner feed structure.

Still another specific object of the invention is to provide an auger housing rear transition section, as defined in the immediately preceding object, wherein each corner feed structure is disposed such that, as considered in the direction of auger rotation, the auger flighting first sweeps past a leading edge formed by a side of the first wall of the structure and then sweeps by a trailing edge formed by a side of the second wall of the structure, and stripper bars, or like structures, being located along said trailing edge of each corner feed structure so as to strip crop from the outer periphery of the auger flighting and force it into the space defined by the two walls of each corner feed structure.

These and other object will become apparent from a reading of the ensuing description together with the appended drawings.

BRIEF DESCRIPTION OF THE DRAWINGS

FIG. 1 is a somewhat schematic right side elevational view of a baler embodying the present invention.

FIG. 2 is a longitudinal vertical sectional view showing the rear transition section of the auger housing and the forward end of the bale-forming chamber with the former being shown separated from the latter for more clearly showing the compaction rollers at the aft end of the auger shaft and rear end portions of the corner feed structures and of stripper plates respectively associated with the corner feed structures.

DESCRIPTION OF THE PREFERRED EMBODIMENT

Figure 3:
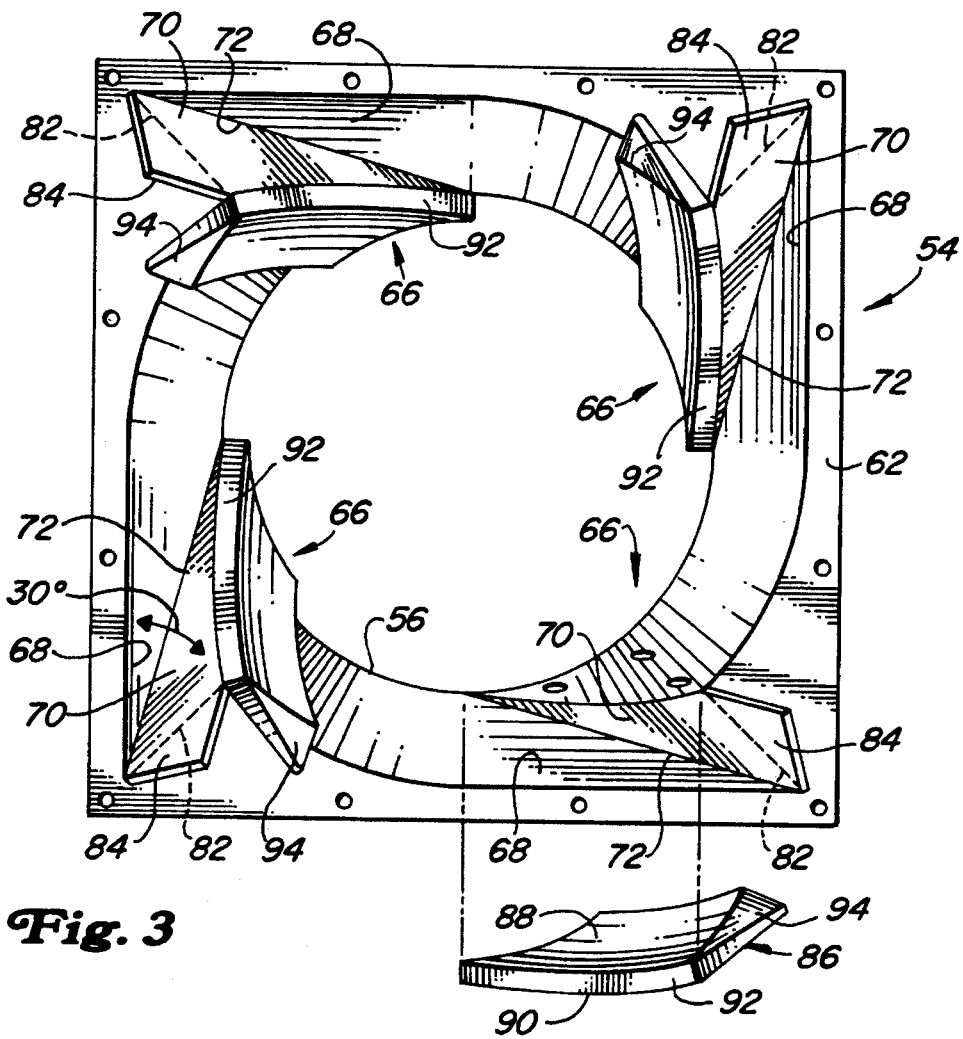
FIG. 3 rear, axially perspective view of the transition section of the auger housing showing one of the stripper plates in exploded fashion.

Referring now to FIG. 1, there is shown a baler 10 of a type used for forming parallelepiped-shaped bales of crop material and including a main frame 12 supported on a pair of ground wheels 14 and to the forward end of which is secured a hitch structure 16 adapted for being coupled to a tractor (not shown). The frame 12 is composed of structural components of functional elements of the baler 10, these elements including, as considered from front to rear, an auger housing 20, a bale-forming chamber 22 and a bale-tying chamber 24.

A crop pickup 26 extends transversely beneath the auger housing 20 and is pivotally mounted, as at 28, to structural members disposed beneath a lower rear location of the auger housing. The pickup 26 includes transversely spaced side walls supporting opposite ends of a toothed rake 30 and of a center-feed auger 32, the latter being operative to feed crop to an inlet 34 formed by cutting away a lower front portion of a cylindrical tubular body 36 defining a forward section of the auger housing 20. Located along a longitudinal axis of the auger housing 20 is a compaction auger 38 having a central tubular cylindrical shaft 40 supporting flighting 42, in the form of a double helix, for receiving crop from the pickup 26 and feeding it rearwardly to the bale-forming chamber 22. A forward end section of the auger shaft 40 is supported by and journalled for rotation in a gear box 43, the latter being fixed to the frame 12. A drive shaft 44 is coupled between a tractor p.t.o. shaft (not shown) and an input shaft of gearing located within the gear box 43, the gearing including a gear mounted to the forward end section of the auger shaft 40.

Figure 4:
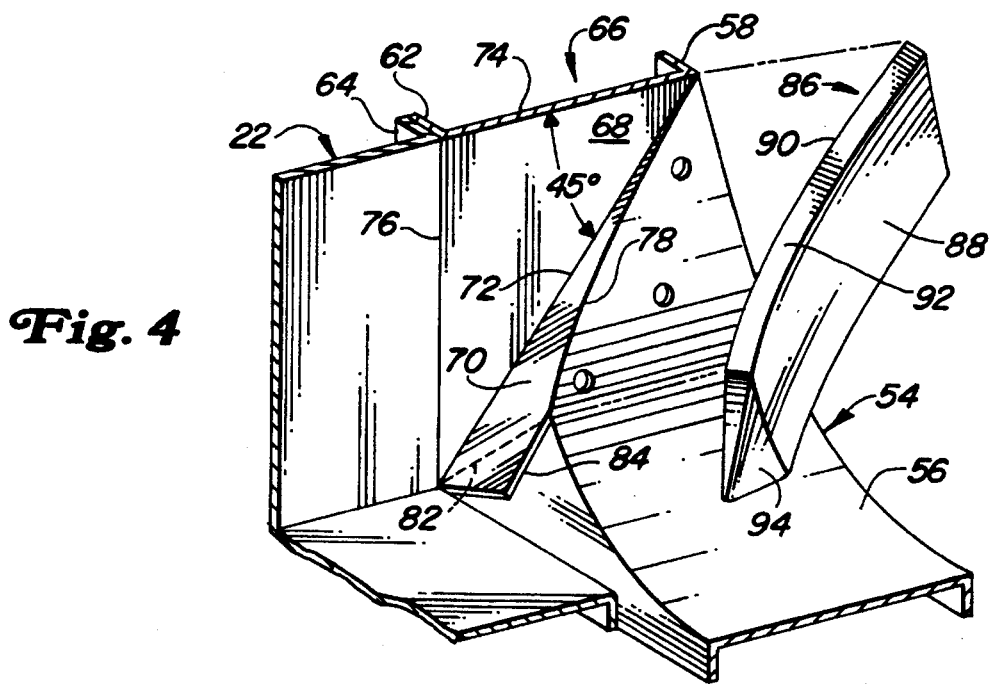
FIG. 4 is a right rear perspective view of the lower left quadrant of the transition section of the auger housing showing the associated stripper plate in exploded fashion.

Referring now also to FIGS. 2–4, it can be seen that the auger shaft 40 includes a rear section that extends a short distance rearwardly of the flighting 42 and auger housing 20, and mounted to diametrically opposite locations of the rear end of the shaft 40 for rotation about a radially extending axis, are a pair of radially extending compaction rollers 46. Top and bottom walls 48 and 50, respectively, of the bale-forming chamber 22 contain panels (not shown) mounted for swinging vertically about horizontal transverse pivot mountings at their forward ends and operatively coupled to the panels of the walls 48 and 50 are a pair of hydraulic cylinders 52 which operate to adjust the distance between the rear ends of the panels in order to change the resistance to crop flow through the chamber and, hence, to change the density of the bale being formed in the chamber 22.

Up to this point, the description is that of the known baler disclosed in U.S. Pat. No. 5,377,481 mentioned herein above and if more details of this structure is desired resort may be had to this patent.

A rear end portion of the auger housing 20 is defined by a transition section 54 primarily formed by a cylindrical tube 56 having a flange 58 at its forward end bolted to a flange 60 at the rear end of the front auger housing section 36. An aft or downstream end of the auger housing transition section 54 terminates in a vertical transverse plane located at the rear of the auger flighting 42 and is provided with a flange 62 releasably bolted to a similar flange 64 provided at the front or upstream end of the bale-forming chamber 22.

As can best be seen in FIG. 3, four identical corner feed structures 66 are incorporated at equally spaced upper right, upper left, lower left and lower right areas of the auger housing transition section 54. Each corner feed structure 66 includes first and second planar walls 68 and 70, respectively, joined together at an acute angle of approximately 30° to form a corner 72. With reference to FIG. 4, it will be appreciated that each first wall 68 is disposed in co-planar relationship to a respective side wall of the bale-forming chamber 22 and is in the form of a right triangle having a hypotenuse at the corner 72, a horizontal first leg 74, extending parallel to the axis of rotation of the auger 38, and a second leg 76 located in co-planar relationship to a respective side wall of the bale-forming chamber 22. Each second wall 70 has a side 78, which follows a spiral path along and is joined to the cylindrical tube 56. The corner 72, first wall leg 74 and second wall side 78 diverge rearwardly from an apex 80 located at the forward end of the housing transition section 54. As viewed from the rear, the four apices 80 of the corner feed structures 66 are respectively located at 12:00 o'clock, 3:00 o'clock, 6:00 o'clock and 9:00 o'clock positions about the auger housing longitudinal axis and the respective corners 72 of the corner feed structures leads from the apices to a respective corner of the baling chamber 22. Further, it should be noted that each second wall 70 intersects the housing section 54 along a line 82 extending radially relative to the central axis of the housing section and has a triangular rear section 84 extending rearwardly beyond the line 82 so as to be located within the upstream end of the bale forming chamber 22. The triangular rear sections 84 serve to resist any tendency the material being baled has to rotate within the baling chamber.

Associated with each of the corner feed structures 66 is a stripper plate 86 which in large part is in the form of a tubular segment having inner and outer surfaces 88 and 90, respectively, with the outer surface 88 being formed at a radius equal to that of an inside wall of the tube 56 and with the inner surface 90 being formed at a radius only slightly greater than the radius of the auger flighting 42. Relative to counterclockwise rotation of the auger 38, the stripper plates 86 are mounted to the tube 56 at the respective trailing sides of the corner feed structures 66, the stripper plates 86 each having a leading edge 92 shaped so that it follows the edge 78 of the corner feed structure second wall 70. Rear ends 94 of the stripper plates 86 each project rearwardly beyond the corner feed structures. It is here noted that the edges 78 of the corner feed structure second walls 70, and hence the leading edges 92 of the stripper plates 86 are oriented at approximately a right angle to the auger flighting 42 in the vicinity of the respective areas sweeping past the stripper plates. Crop material stripped from the auger flighting 42 and rollers 46 thus enters the corner feed structures and is guided to the four corners of the bale-forming chamber 22. Additionally, the stripper plates 86 are in close juxtaposition to the flighting 42 and cooperate to support the rear portion of the auger 38.

Figure 5:
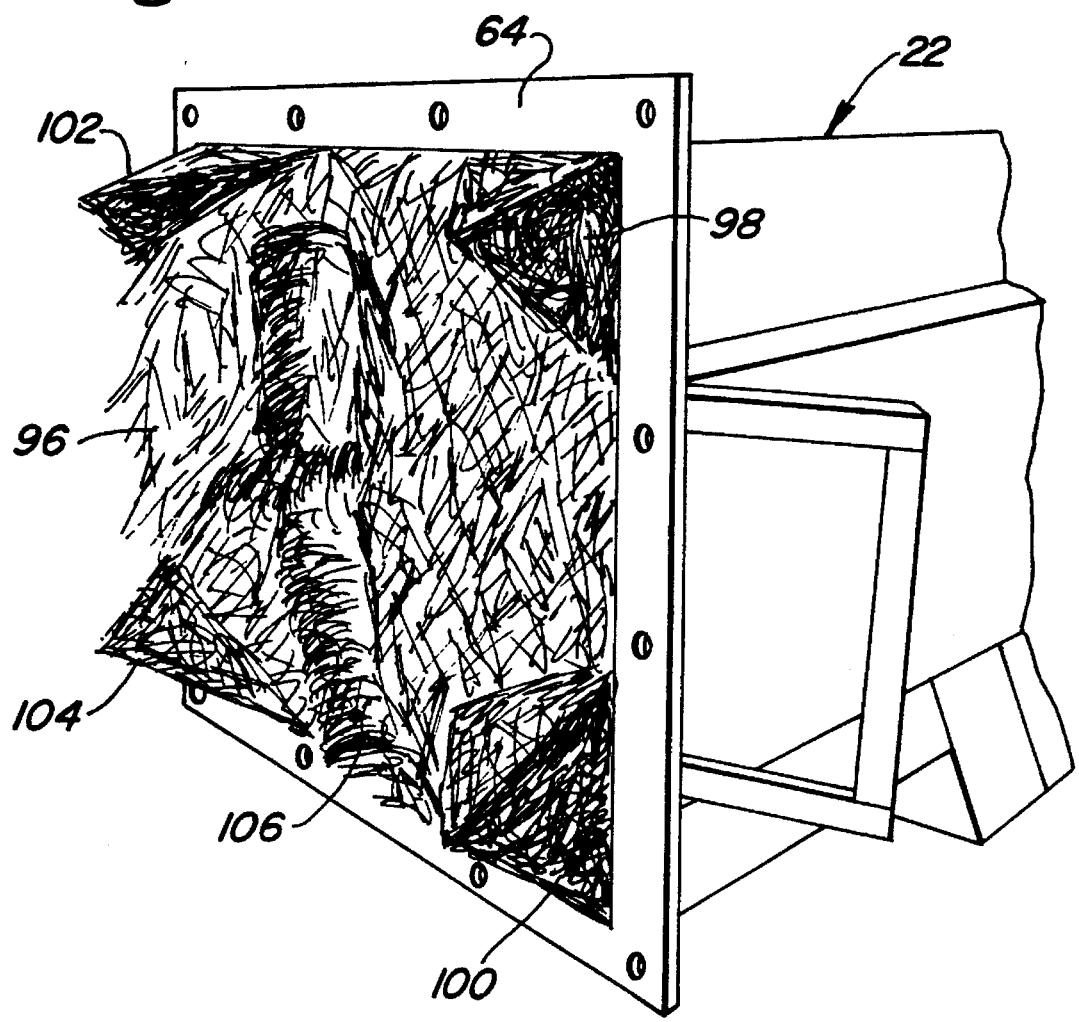
FIG. 5 is a right front perspective view of the bale-forming chamber showing the crop material at the corners of the chamber and showing the imprint in the crop material caused by the compaction rollers and aft end of the auger shaft.

Referring now to FIG. 5, there can be seen the rear end of a bale 96 being formed in the bale-forming chamber 22. Specifically, it can be seen that crop is evenly distributed to upper and lower left corners 98 and 100, respectively and upper and lower right corners 102 and 104, respectively, so as to form right-angle corners, as is desired. Also, extending across the face of the bale 96 is an imprint 106 caused be the aft end of the auger shaft 40 and the compaction rollers 46.

Thus, it will be appreciated that the auger 38, corner feed structures 66 and stripper plates 86 cooperate to make bales 96 having right-angle corners and crop distributed evenly throughout.

We claim:

1. In a baler for compressing crop material into parallelepiped bales and including a mainly cylindrical auger housing located in fore-and-aft alignment with and joined to a forward end of a bale-forming chamber having four walls disposed to have a rectangular cross section, said auger housing containing an auger for compacting crop material into said bale-forming chamber, the improvement comprising: a rear portion of said auger housing including a rear transition section including four identical corner feed structures for respectively feeding crop towards respective corners of said bale-forming chamber; said corner feed structures each having first and second walls, with said first wall being disposed in co-planar relationship to a respective one of said four walls of the baling-chamber; said first and second walls having respective first sides joined together to form a corner and being disposed relative to each other such that they meet at said corner at an acute angle; and said corner being disposed at an acute angle relative to the horizontal.

2. The baler defined in claim 1 wherein said first wall of each corner structure is joined to a cylindrical wall portion, of said rear transition section of said auger housing, along a horizontal, fore-and-extending line.

3. The baler defined in claim 1 wherein said acute angle formed by said first and second walls at said corner is in the neighborhood of 30°.

4. The baler defined in claim 1 wherein said second wall intersects a rear end of said housing transition section along a line disposed radially to an axis of rotation of said auger.

5. The baler defined in claim 1 wherein the angle defined by the corner and the horizontal is in the neighborhood of 45°.

6. The baler defined in claim 5 wherein said acute angle formed by said first and second walls at said corner is in the neighborhood of 30°.

7. The baler defined in claim 6 wherein said second wall of each corner feed structure has a second side which is joined to a cylindrical portion of said rear transition section of said auger housing along a curved line which is oriented at approximately a right angle to a section of said flighting passing adjacent to said second side.

8. The baler defined in claim 1 and further including a combined auger support and stripper plate associated with each corner structure and being fixed to said transition section of the auger housing and extending generally parallel to said second side of the second wall along the downstream side of each corner structure, as considered with respect to the direction of rotation of said auger, whereby each stripper plate will cause material carried at an outer portion of the auger flighting to be fed into the associated corner feed structure and the stripper plates will cooperate with each other to support the rear end portion of the auger.

9. In a baler of a type including a mainly cylindrical auger housing having an inlet opening in a forward section thereof and having a rear end joined to a bale-forming chamber which is rectangular in transverse cross section, an auger having a central shaft disposed along a longitudinal axis of said auger housing, having a forward end supported in a gear box, having a rear end section located within an entry section of said bale-forming chamber and having flighting spirally wound along and joined to said central shaft and extending across said inlet opening and terminating at a downstream end of said auger housing for moving fibrous material, delivered to said inlet opening, through said downstream end of said auger housing, a pair of diametrically opposite rollers mounted for rotation about a radial axis and acting in concert with said flighting for compacting fibrous material in said bale-forming chamber, the improvement comprising: said rear end of said auger housing forming part of a transition section having a downstream end including four separate circular portions located in a vertical transverse plane within an imaginary rectangle having four sides respectively extending tangentially to said four separate circular portions and having a size equal to that of the rectangular cross section of an entrance to said bale-forming chamber; said rear transition section including four corner feed structures spaced equally from each other about said longitudinal axis and each including first and second walls joined to each other to form an acute angle and meeting at an apex at an upstream end of said transition section with the first and second walls each increasing in width from said apex toward respective downstream ends thereof; each first wall being co-planar with a respective wall of said bale-forming chamber and having a downstream end dimensioned so as to be equal to one-half the distance between adjacent corners of said imaginary rectangle; whereby said first and second walls of each corner feed structure are joined to form a corner which extends from said apex to a respective corner of said bale-forming chamber.

10. The baler defined in claim 9 wherein said second wall of each corner feed structure intersects a downstream end of said housing transition section along a line oriented radially relative to said auger shaft.

11. The baler defined in claim 9 wherein said second wall of each corner feed structure extends downstream beyond said imaginary rectangle so as to present an obstruction to any tendency of the material being baled to rotate in the bale-forming chamber.

* * * * *